United States Patent
Strawczynski et al.

[19]

[11] Patent Number: 6,038,452
[45] Date of Patent: Mar. 14, 2000

[54] TELECOMMUNICATION NETWORK UTILIZING A QUALITY OF SERVICE PROTOCOL

[75] Inventors: Leo Strawczynski, Ottawa; Bill W. A. Gage, Stittsville; Rafi Rabipour, Côte St. Luc, all of Canada

[73] Assignee: Nortel Networks Corporation, Montreal, Quebec, Canada

[21] Appl. No.: 08/921,278

[22] Filed: Aug. 29, 1997

[51] Int. Cl.[7] .................................................. H04Q 7/20
[52] U.S. Cl. ........................... 455/446; 455/522; 455/403
[58] Field of Search ........................ 455/63, 67.1, 67.3, 455/403, 422–425, 446–447, 461, 466, 501, 507, 522, 560, 574; 370/338, 349, 389

[56] References Cited

U.S. PATENT DOCUMENTS

| | | | |
|---|---|---|---|
| 5,551,057 | 8/1996 | Mitra | 455/422 X |
| 5,577,029 | 11/1996 | Lu et al. | 455/560 X |
| 5,608,779 | 3/1997 | Lev et al. | 455/436 |
| 5,666,649 | 9/1997 | Dent | 455/445 |
| 5,729,557 | 3/1998 | Gardner et al. | 371/41 |
| 5,752,197 | 5/1998 | Rautiola | 455/522 |
| 5,774,785 | 6/1998 | Karlsson | 455/522 |
| 5,793,762 | 8/1998 | Penners et al. | 370/389 |
| 5,848,359 | 12/1998 | Furtaw | 455/447 |
| 5,884,179 | 3/1999 | Patel | 455/445 |

FOREIGN PATENT DOCUMENTS

96/199070  6/1996  WIPO .

Primary Examiner—William G. Trost

[57] ABSTRACT

The present invention provides novel systems and methods for improving the voice quality of wireless-to-wireless calls or wireless-to-fixed terminal calls. This disclosure describes methods and apparatuses to determine and control the quality of service objectives in a telecommunication network involving at least one wireless terminal.

40 Claims, 6 Drawing Sheets

Figure 2

... xxxxxxxx xxxxxxxx xxxxxxxx xxxxxoxx xxxxxxxx xxxxxxxx xxxxxoxx ...

8 bit PCM sample 8 bit PCM sample with signaling bit

Note: The X's represent PCM information bits and the O's represent the signaling message bits.

TELECOMMUNICATION NETWORK UTILIZING A QUALITY OF SERVICE PROTOCOL

FIELD OF THE INVENTION

The invention relates to the field of signal processing, particularly in the environment of analog and digital cellular communication network. More specifically, the invention relates to a method and to an apparatus to enable better control of the quality of service of signals in a telecommunication network.

BACKGROUND OF THE INVENTION

In recent years, we have witnessed the proliferation of wireless voice telecommunication networks. Unfortunately, due to RF channel impairments and use of speech compression techniques, voice quality in the wireless network is not as good as it is in the wireline network. There is therefore a thrust to provide better voice quality in wireless communications.

In wireless networks, channel bandwidth is at a premium. There is therefore an advantage in compressing voice signals in digital format by an apparatus called a vocoder. The name "vocoder" stems from the fact that its applications are specific to the encoding and decoding of voice signals primarily. Vocoders are usually integrated in mobile telephones and the base stations (or a link therefrom) of the telecommunication network. They provide compression of a digitized voice signal as well as the reverse transformation. Pulse Code Modulation (PCM) is an example of a signal digitization technique. The main advantage of compressing speech is that it uses less of the limited channel bandwidth for transmission. The main disadvantage is some loss of speech quality.

In wireless telecommunications, the determination of quality of service (QOS) objectives is an issue that significantly affects voice quality. In the case of digital transmission, quality of service is usually measured by calculating the frame error rate (FER). FER is simply a measure of the number of frames in error during a certain period of time. QOS is therefore controlled by altering certain parameters of the network, which influence the Frame Error Rate (FER). It can be improved by raising the energy-per-bit to noise ratio (Eb/No). In the case of analog transmission, quality of service is usually measured by calculating the signal-to-noise-ratio (SNR). The principal parameter for controlling QOS is the variable power settings of the signal transmitters in the wireless terminals and the base stations. Through established methods of signaling and control, these power settings are adjusted depending on many factors, namely: the distance between the wireless terminal and the base station, interference on the RF channel, etc.

Another parameter that may be changed to influence QOS is the use of different Forward error correction (FEC) techniques for data packets transported over the RF channels. That is, some FEC techniques are better than others are (and to some extent more complicated and more costly to implement) and using them helps to improve QOS. Several FEC techniques are briefly described later in this specification.

Yet another parameter that may be changed to influence QOS is frequency reuse (also called frequency planning). Wireless telecommunication networks rely on an intelligent allocation and reuse of channels throughout a coverage region. Each base station is allocated a group of RF channels to be used within a small geographic area called a cell. Base stations in adjacent cells are assigned channels that are different from those of its neighbors. The base station antennas are designed to achieve the desired coverage within the specified cell. By limiting the coverage area to the boundaries of a cell, the same group of channels may be used to cover different cells separated from each other by distances large enough to keep interference levels at a minimum. The design process of selecting and allocating channel groups for all the base stations within a network is frequency reuse or planning.

In actual telecommunications systems, QOS is usually set at a specified level for the end-to-end connection. Typically, this implies that there is only one radio link (e.g. a wireless-to-wireline call). The system is therefore designed for a connection involving only one RF link. However, for a connection involving more than one RF link (e.g. a wireless-to-wireless call), leaving the QOS objectives at the same level as for a connection involving only one RF link results in a particular problem. In effect, with the same QOS objectives, a wireless-to-wireless connection, involving two radio links, will result in approximately twice as many errors permitted for the data frames as would a wireless-to-wireline connection, involving only one radio link. This situation can be remedied simply by determining the nature of the end-to-end connection and then setting the quality of service objectives for each radio link accordingly. This will result in enhanced speech quality in wireless-to-wireless links.

Thus, there is a need in the industry to provide a method and an apparatus for improving the voice quality of wireless connections by controlling the quality of service objectives depending on the nature of the end-to-end telecommunication link.

OBJECTS AND STATEMENT OF THE INVENTION

An object of the invention is to provide a communication network capable of adjusting the quality of service value of a given link of the communication network during a call, in dependence upon the particular pathway established through the network through which the data is carried.

Another object of the invention is to provide a method for controlling the quality of service value of a given link of the communication network during a call, in dependence upon the particular pathway through the network through which the data is carried.

Yet another object of the invention is a communication network capable of adjusting the quality of service value of an end-to-end connection in the network in dependence of the type of connection involved, either wireless-to-wireless or wireless-to-wireline.

A further object of the invention is to provide a method for adjusting the quality of service value of an end-to-end connection in the network in dependence of the type of connection involved, either wireless-to-wireless or wireless-to-wireline.

Yet another object of the invention is to provide a communication network control processor for regulating the power output of transmitters in one or more wireless links in dependence of the number of wireless links associated with a given call.

As embodied and broadly described herein, the invention provides a communication network, comprising:
 a) a plurality of links capable of transporting data, at least one of said links being a wireless link, in a course of a given call, selected ones of said plurality of links being connected to one another to establish a pathway for data to be transported through said network;

b) a control system capable of altering at least one parameter of said network that influences a quality of service value in the pathway established in a course of a given call, in dependence upon a number of wireless links contained in the pathway over which data associated with the given call is transported through said network.

In this specification, "data" will refer to information transmitted either in analog or in digital format.

In this specification, the terms "communication network" and "telecommunication network" are equivalent and are meant to include both analog and digital types of networks.

In this specification, "quality of service value" is a parameter qualified by:

a) in the case of digital transmission, the frame error rate; and b) in the case of analog transmission, the signal-to-noise ratio.

In this specification, the term "wireless terminal" is intended to include both mobile terminals and fixed wireless terminals. The expression "wireless link" includes a communication path through which data is transported at least in part over an air interface, while "wireline link" designates a communication path in which data is exchanged primarily over a cable, such as a metal conductor or optical fiber.

The term "base station" in a wireless communication network is meant to design a fixed station enabling, through radio communications with a wireless terminal, a link between the wireless terminal and the "backbone" network (also called landline network). Base stations are located at the center or on the edge of a coverage region (cell) and may include, among others, a base transceiver station (BTS), a base station controller (BSC), antennas, etc.

In this specification, the expression "data packet" will refer to a group of bits organized in a certain structure that conveys some information. Typically, a data packet when representing a sample of compressed audio information will usually include a user segment (containing the speech information), a signaling and control segment, an address segment, a header and a trailer segment, etc.

In this specification, the expression "data frame" or "frame" will refer to the part of the data packet that contains the user segment, in this case the speech information.

In a most preferred embodiment, the control system of the communication network determines, in the course of a given call, the type of links that need to be connected to one another in order to establish a complete pathway for transporting the signal from one terminal to the other terminal. If the pathway includes two or more wireless links, the control system will then adjust one or more parameters of the communication network in an attempt to reduce the error rate. One possible way to control the error rate is to adjust the power output of the transmitters at each end of a communication link. (In a duplex communication link two transmitters are involved, one in each direction. This type of link is very common. In a situation where a unidirectional link is involved, a single transmitter may be present). In a specific example, when a wireless-to-wireless call is made, at least two wireless links are involved in the connection. The first wireless link is established between the calling terminal and its base station. The second wireless link is established between the called terminal and its respective base station. Typically, the base stations will be connected to one another by a wireline link. Since the probability that data is transmitted in error over a wireless link is greater than the probability of error during transmission over a wireline link, the larger the number of wireless links in the transmission, the greater the error rate will be. In those circumstances, increasing the power output of the transmitters in each wireless link allows to maintain an acceptable overall error rate. In a different situation, however, when a wireless-to-wireline call is made, the error rate for the end-to-end connection is likely to be less than in the case of the example above, since a single wireless link is involved. This link is from the wireless terminal to its associated base station. The remaining part of the connection is established over a wireline toward the fixed terminal. Typically, such connection may be effected through the PSTN or the ISDN network. In this example, the power output of the transmitters may be reduced since a single wireless link is involved in the connection.

The control system that regulates the power output setting of the transmitters in a given wireless link might be located at any suitable location in the network. A typical cellular network includes one or more base stations connected to a mobile switching center. In certain cellular network designs, for wireless-to-wireless calls, the signal pathway may pass through the mobile switching center. In the case of a wireless-to-wireline call, the mobile switching center constitutes an interface between the cellular network and the PSTN or ISDN network, as the case may be. Most preferably, the control system is a network control processor located at the mobile switching center. In the course of a given call, the control processor identifies the number of wireless links that are involved (in one specific example this may be effected by identifying the source and destination of each data packet). If a single wireless link exists, the signal processor will set the transmitters in that particular link to a comparatively low power output level. This setting or command function may be effected through inband or out-of-band signaling. In a situation where two or more wireless links are present in the connection, the transmitters in each link are set to a higher output power level.

More sophisticated control strategies may also be implemented. One possibility is to progressively step up the power output level of each transmitter in dependence of the number of wireless links, rather than simply setting the transmitters respectively at low power range or at high power range if one or more wireless links are involved in the connection. Thus, in a situation where three wireless links are involved, the power output level will be higher than in a case involving only two wireless links. There is a limit, however, to this process since the power output level cannot exceed a certain threshold that is determined by the type of equipment used, regulations etc.

As embodied and broadly described herein the invention also provides a communication network, comprising:

a) a plurality of links capable of transporting data, at least one of said links being a wireless link, in a course of a given call selected ones of said plurality of links being connected to one another to establish a pathway for data to be transported through said network;

b) a control system for regulating a power output level of a transmitter in a given wireless link of said network, said control system providing means for setting said transmitter at a first setting when said given link is comprised in a pathway including N wireless links and at a second setting when said given link is comprised in a pathway including M wireless links, where M<N and in said first setting said transmitter operates at a higher power output level than in said second setting.

As embodied and broadly described herein the invention also provides a communication network, comprising:

a) a plurality of links capable of transporting data, at least one of said links being a wireless link, in a course of a given call selected ones of said plurality of links being connected to one another to establish a pathway for data to be transported through said network;

b) a control system for regulating a power output level of a transmitter in a given wireless link of said network, said control system providing means for setting said transmitter at a first setting when said given link is comprised in a pathway established in a course of a wireless-to-wireless call and at a second setting when said given link is comprised in a pathway established in a course of a wireless-to-wireline call, in said first setting said transmitter operates at a higher power output level than in said second setting.

As embodied and broadly described herein the invention also provides a communication network control processor comprising processing means and storage means for storing instructions for operation of said processing means, said instructions implementing functional blocks, said control processor being capable of regulating at least one parameter of a communication network that includes a plurality of links capable of transporting data packets, at least one of said links being a wireless link, in a course of a given call selected ones of said plurality of links being connected to one another to establish a pathway for data packets to be transported through said network, said functional blocks including:

a) an input for receiving data indicative of a number of wireless links comprised in the pathway established in a course of a given call;

b) power output level determination means coupled to said input for determining a power output level of a transmitter in one of the wireless links comprised in the pathways established in the course of the given call in dependence of the number of wireless links involved in the pathway established in the course of the given call;

c) an output coupled to said power output level determination means for generating data indicative of the power output level determined by said power output level determination means.

As embodied and broadly described herein, the invention also provides a method for controlling a communication network to reduce a frame error rate, said network comprising:

a) a plurality of links capable of transporting data packets, at least one of said links being a wireless link, in a course of a given call selected ones of said plurality of links being connected to one another to establish a pathway for data packets to be transported through said network;

b) said method comprising the steps of:
   i) establishing a pathway through said network to allow data packets to be transported from one terminal to another terminal;
   ii) identifying a number of wireless links in the pathway established at step i);
   iii) adjusting an output power level of a transmitter in at least one of the wireless links comprised in the pathway identified at step i) in dependence of a number of wireless links in the pathway identified at step ii).

DESCRIPTION OF A PREFERRED EMBODIMENT

Figure 1:
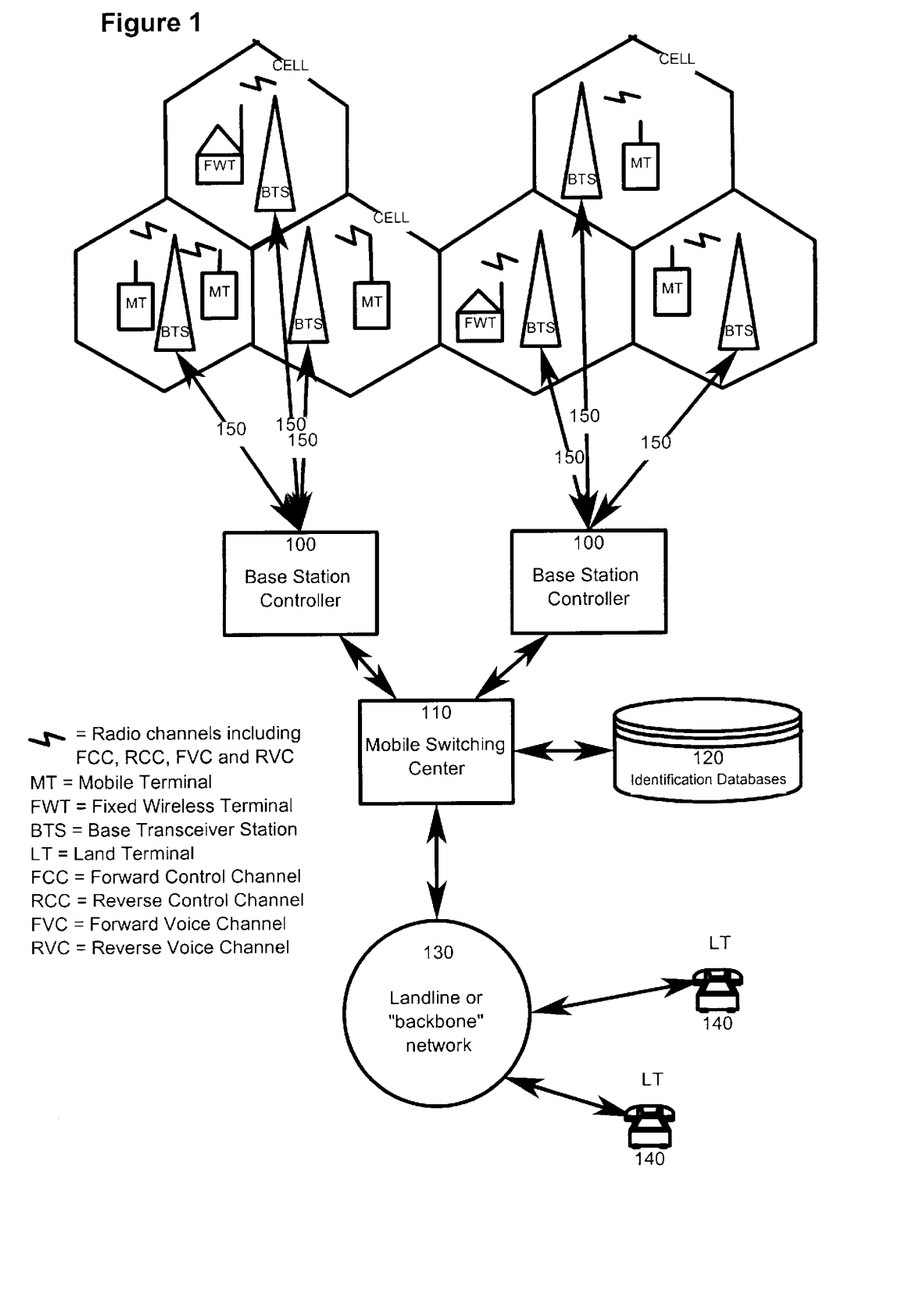
FIG. 1 is a block diagram representation of a portion of a cellular wireless telecommunications network.

FIG. 1 is a block diagram representation of a partial cellular wireless telecommunications network. The following paragraphs describe a possible design for a wireless telecommunication network. As a person versed in the art will notice, this example describes only one of many possible wireless network configurations. Wireless networks often differ in their components, in the component's interaction with each other and in the terms used to describe elements of the network.

In FIG. 1, Mobile terminals (MT) are on the move in the hexagonal areas defined as cells. Fixed wireless terminals (FWT) are also included in the areas defined as cells. Each cell covers a predetermined geographical area and has a Base Transceiver Station (BTS) which communicates through radio channels with the MTs and FWTs. Typically, these channels are in the 900 MHz, 1.8 GHz or 1.9 GHz ranges. A number of BTSs (i.e. cells) are connected by land line or microwave link 150 to one Base Station Controller 100 (BSC) that controls handoff functions and routes the signal as requested. The link 150 carries both signal and control and user (speech) information. A number of BSCs are in turn connected to a Mobile Switching Center 110 (MSC). The MSC coordinates the activities of all its BSCs, verifies/acknowledges MT information through its identification database 120 and provides a connection to a landline network 130 (also called "backbone" network). Examples of landline network include, among others, the Public Switched Telephone Network (PSTN), the Integrated Services Digital Network (ISDN) and the Internet network. Land terminals 140 (LT) are also shown for completeness. Note that the PSTN and LTs are not part of the cellular wireless communication network.

When a call is made to or from a wireless terminal (MT or FWT), four radio channels are involved in each of the links between a wireless terminal and a BTS. The channel used to communicate voice data from the BSC to the wireless terminal is called the Forward Voice Channel (FVC). The channel used to communicate voice data from the wireless terminal to the BSC is called the Reverse Voice Channel (RVC). Two other channels carry the handshaking information required to establish communications with wireless terminals. They are the Forward Control Channel (FCC) and the Reverse Control Channel (RCC). Among other things, the FCC and RCC are used to broadcast the mobile identification number (MIN) (i.e. the wireless terminal's phone number). Transmission power in the MTs and BTS is monitored and controlled, and when MTs move from one cell to another, a switching technique called handoff is initiated.

When a wireless terminal is first turned on, without it being involved in a call, it scans the FCCs to determine which one has the strongest signal. It then monitors the chosen FCC until the signal drops below a usable level. The process of finding a FCC and monitoring it is then repeated. For a communication to be established from a wireless terminal, a call initiation request is sent on the RCC. With this request the wireless terminal transmits its MIN, electronic serial number (ESN) and the telephone number of the called party, if the call is to a wireline terminal, or the MIN and ESN of the called party, if the call is to another wireless terminal. The wireless terminal also transmits a station class mark (SCM) which indicates the maximum transmitter power level for that particular user. The BTS receives this data and sends it to the MSC via the BSC.

For a call to a wireline terminal, the MSC validates the request, makes the connection to the called party through the PSTN, and instructs the BTS and wireless terminal to use a selected FVC and RVC pair to allow the conversation to begin.

For a call to another wireless terminal, the MIN of the called party is broadcast as a paging message over all of the FCCs throughout the cellular system. The called wireless terminal receives the paging message sent by its BTS, which it monitors, and responds by identifying itself over the RCC. The BTS relays the acknowledgement sent by the wireless terminal, and informs the MSC of the handshake. Then, each MSC involved instructs the BTSs to use a free FVC and RVC pair. At this point another data message (called an alert) is transmitted over the FCC to instructs the wireless terminal to ring.

Once a call is in progress, the MSC adjusts the transmitted power of the wireless terminal and changes the channels involved in order to maintain call quality as the subscriber moves in and out of range of each BTS. Signal and control is included in the voice channels so that the wireless terminal may be controlled by the BTS and MSC while a call is in progress.

The process described above involving the FCC and RCC is called out-of-band signaling or radio signaling as opposed to in-band signaling which is described below.

The in-band signaling scheme described below is covered in detail in the international application serial number PCT/95CA/00704 dated Dec. 13, 1995. The contents of this disclosure are incorporated herein by reference.

Figure 2:
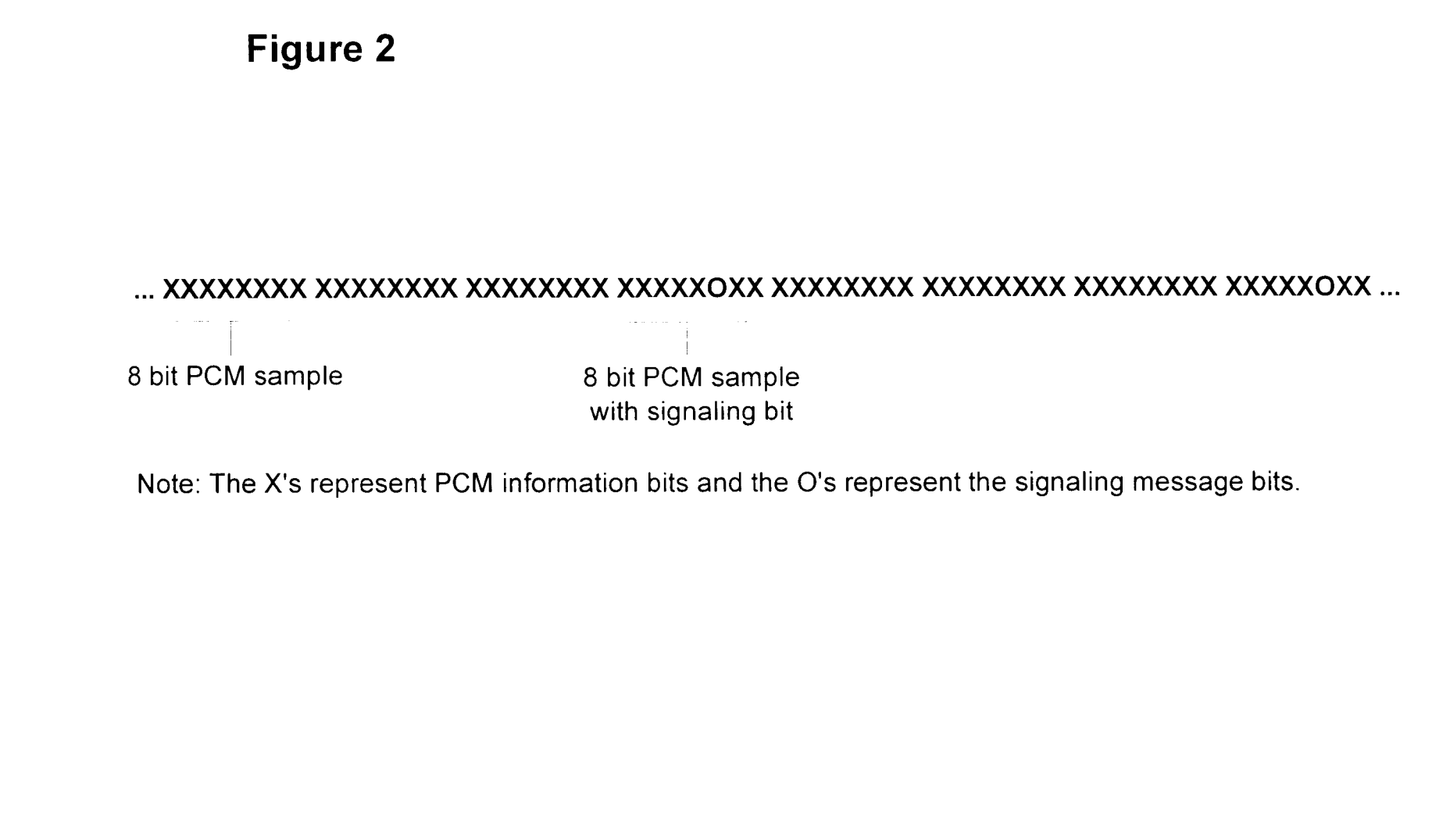
FIG. 2 illustrates a PCM bit stream that carries a signaling message. It is an example of the inband signaling method.

Due to limitations of channel bandwidth, bit stealing can be put in place to realize inband signaling between two vocoders located in separate base stations in the network. This bit-stealing procedure in fact establishes a communication channel between a transmitter and a receiver. Once the channel is established, any type of signal and control information can be communicated. Of course, both ends of the transmission must be configured for this type of in-band signaling. If one of them is not, it will simply ignore the in-band signaling information. Each signaling message bit is sent by replacing a single user audio signal bit from a speech sample. This bit-stealing scheme takes place at a regular interval. The bit location in a speech sample and the bit-stealing interval are selected to minimize the impact on perceived speech quality at the receiver. FIG. 2 shows an example of bit stealing in a frame of 8-bit PCM samples superimposed with a signaling message. Here, bit stealing is depicted as one bit per four sample bytes, but in fact a good rate is one bit every twenty samples. This rate is dependent on the operational parameters of the system.

Methods developed to improve transmission of speech data over the telecommunication network described above, include error control schemes. A general family of control techniques is called Forward Error Correction (FEC). In FEC, redundancy is included within the data frame, which permits the detection and correction of errors. No return path is necessary when using FEC. FEC can be further divided between "Convolutional Codes" and "Block Codes".

In FEC, redundancy is included within the data frame, which permits the detection and correction of errors. No return path is necessary when using FEC. FEC can be divided between "Convolutional Codes" and "Block Codes".

Figure 3:
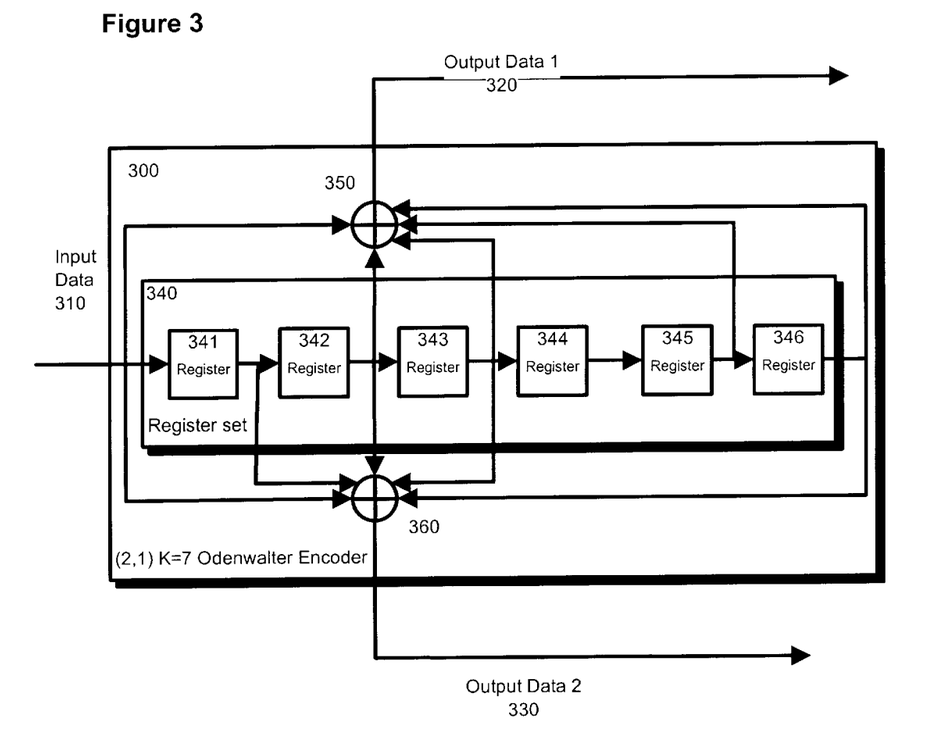
FIG. 3 is block diagram of an encoder for a (2,1) K=7 Odenwalter convolutional code.

Convolutional Codes are best described by an example. The (2,1) K=7 Odenwalter code is such an example and its encoder 300 is depicted at FIG. 3. One data bit 310 is input every clock cycle. From each bit of input data 310, two output bits 320 and 330 are produced (hence the "(2,1)" notation). When a bit of input data 310 enters the encoder it is fed to the register set 340 and recorded in the first register 341. The same bit also contributes to the summations at 350 and 360. The bit then follows the paths shown on the diagram changing registers at each clock cycle and contributing to the summation at different periods in time. The combined output bits 320 and 330 depend on seven of the input bits 310 (6 are from the registers and one is the actual input bit), hence the K=7 appellation. K is called the constraint length. One input bit therefore affects the output bits seven times and there are then seven "opportunities" to decode it correctly at the receiver. The decoder, at the receiver end, knowing the encoding procedure, uses algorithms (usually of the Viterbi type) to recover the data.

In Block Codes, the encoder provides one or more algorithms that separate the information bits into blocks. Each block is represented by a certain number of symbols and redundancy is provided either by adding symbols at the end of the information blocks or by scrambling the data and producing a longer block of symbols. The decoder in the receiver also works with algorithms in a similar fashion and has to be synchronized with the encoder in order to correctly identify the data blocks.

Figure 4A:
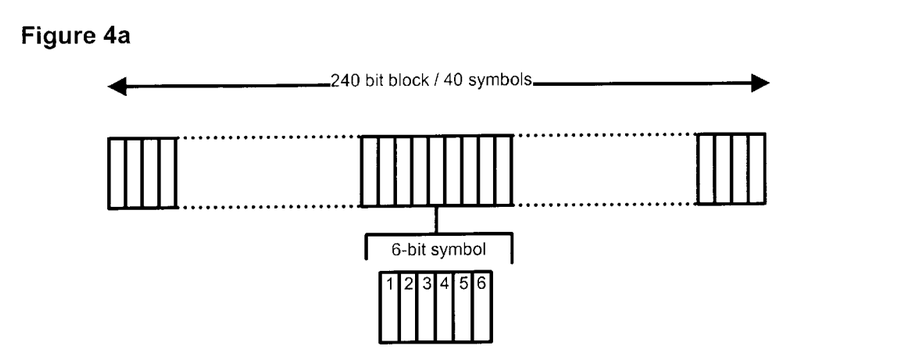
FIG. 4a illustrates a data block prior to being encoded by a Reed-Solomon technique.
Figure 4B:
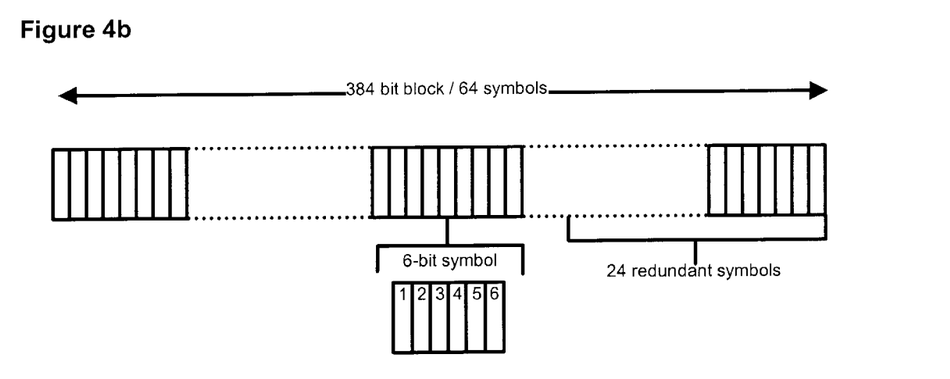
FIG. 4b illustrates a data block after being encoded by the Reed-Solomon technique.
Figure 4C:
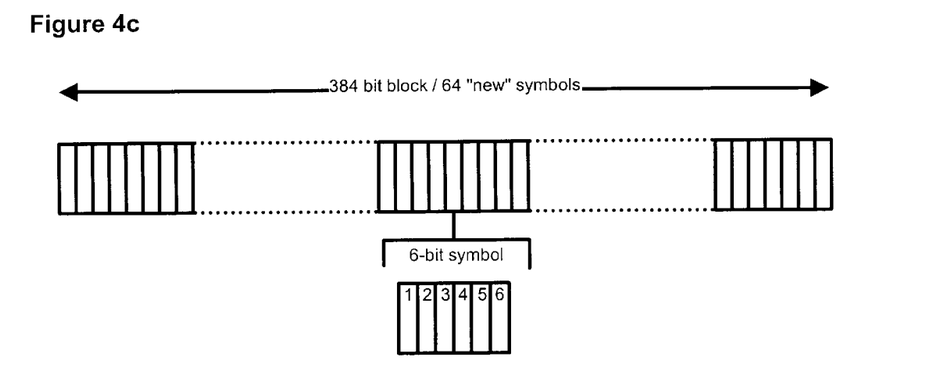
FIG. 4c illustrates a data block encoded by the Reed-Solomon technique in accordance with a variant.

An example of Block Codes is the Reed-Solomon (RS) (64,40) code on 6-bit symbols. As depicted in FIG. 4a, the encoder separates the data stream into 40 six-bit symbols (240 bits). The encoder algorithm then adds 24 six-bit symbols at the end of the data block as shown in FIG. 4b. Another form of the RS (64,40) code on 6-bit symbols algorithm could scramble the data and produce 64 new 6-bit symbols as per FIG. 4c. The correction power of such an RS code is of 12 of the 40 original symbols. One can readily grasp this concept by picturing that of the 24 redundant symbols, the decoder "spends" half on detection of errors and the other half on their correction.

The main feature of this invention is to determine proper Quality of Service (QOS) objectives for individual RF channel links. In the case of a digital transmission, a good measure of QOS is the Frame Error Rate (FER) for an end-to-end connection (x %). The frame error rate is adjusted by controlling the power output of the wireless terminal and the base transceiver station that in turn increases or decreases the Energy-per-bit to Noise density ratio (Eb/No). In a typical example, a FER for an end-to-end connection would be x=1%. In a wireless-to-wireline call, the frame error rate is adjusted to x % and the power adjustments are selected accordingly for the RF channel involved. However, in a wireless-to-wireless call, adjusting the FER to the same x % on each RF channel implies that there will be approximately twice as many errors for the end-to-end connection as there would be for a call involving only one RF channel. The result is lower speech quality. In this case, one possible solution is to make the necessary signal adjustment in order to set the FER to x % for the end-to-end link thereby ensuring the same QOS for a wireless-to-wireless call as for a wireless-to-wireline call. This is what this invention proposes to do.

In a wireless-to-wireless call, if RF channels A and B are independent, FER A+FER B=FER end-to-end =x %. Although the performance objectives for the uplink and the downlink do not need to be identical, typically the QOS for each link will be FER A=FER B =FER end-to-end/2=x/2%. This would insure a real frame error rate of x % for the total wireless-to-wireless link.

From a structural point of view, the apparatus 600 illustrated at FIG. 6 can be used to implement the functions of the QOS objective determination and implementation method whose operations is detailed below and in FIG. 5. The apparatus would be installed in mobile switching centers throughout the network. The apparatus comprises an input signal line 610, a signal output line 612, a processor 614 and a memory 616. The memory 616 is used for storing instructions for the operation of the processor 614 and also for storing the data used by the processor 614 in executing those instructions. A bus 618 is provided for the exchange of information between the memory 616 and the processor 614.

Figure 5:
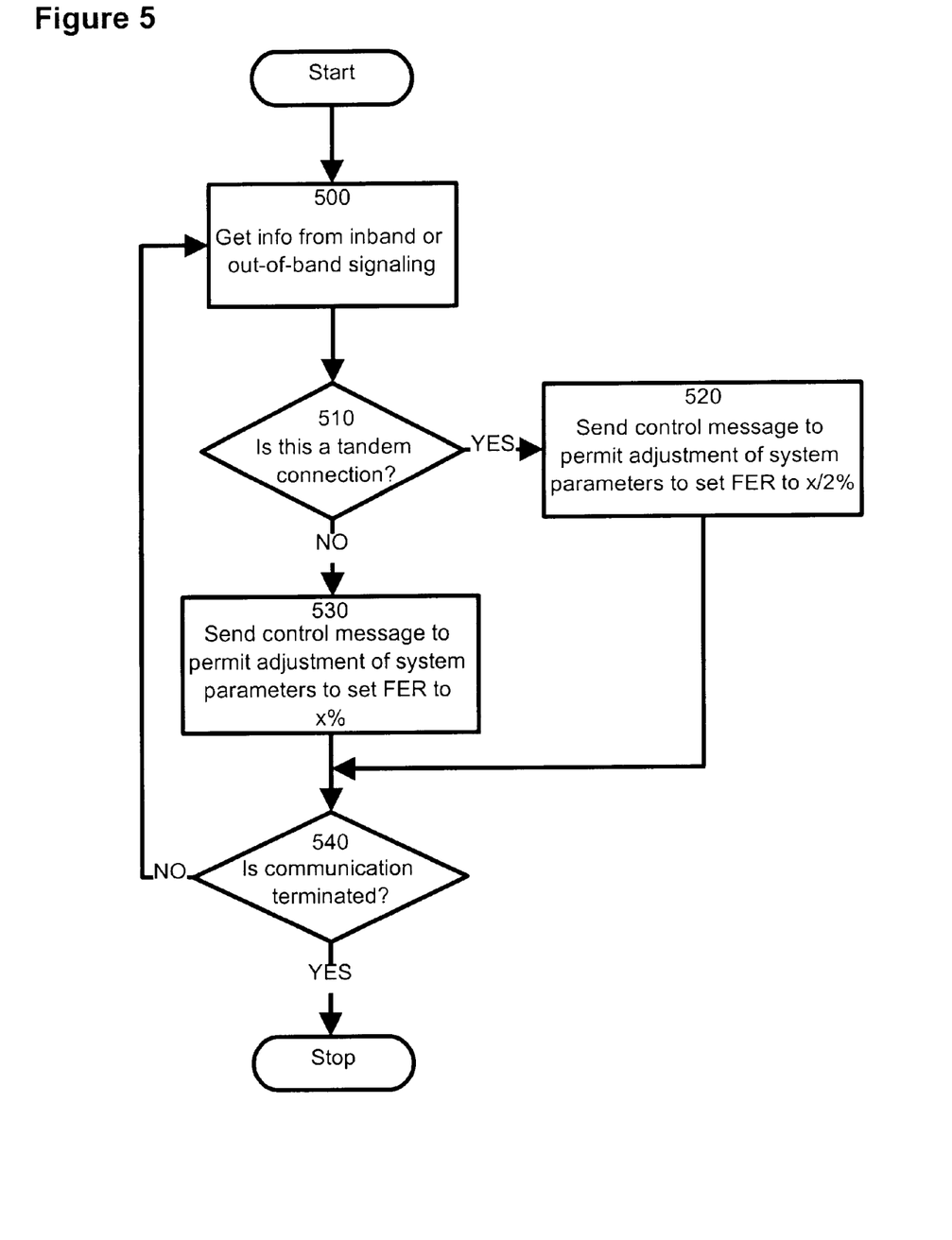
FIG. 5 is a flowchart that details the quality of service determination method.
Figure 6:
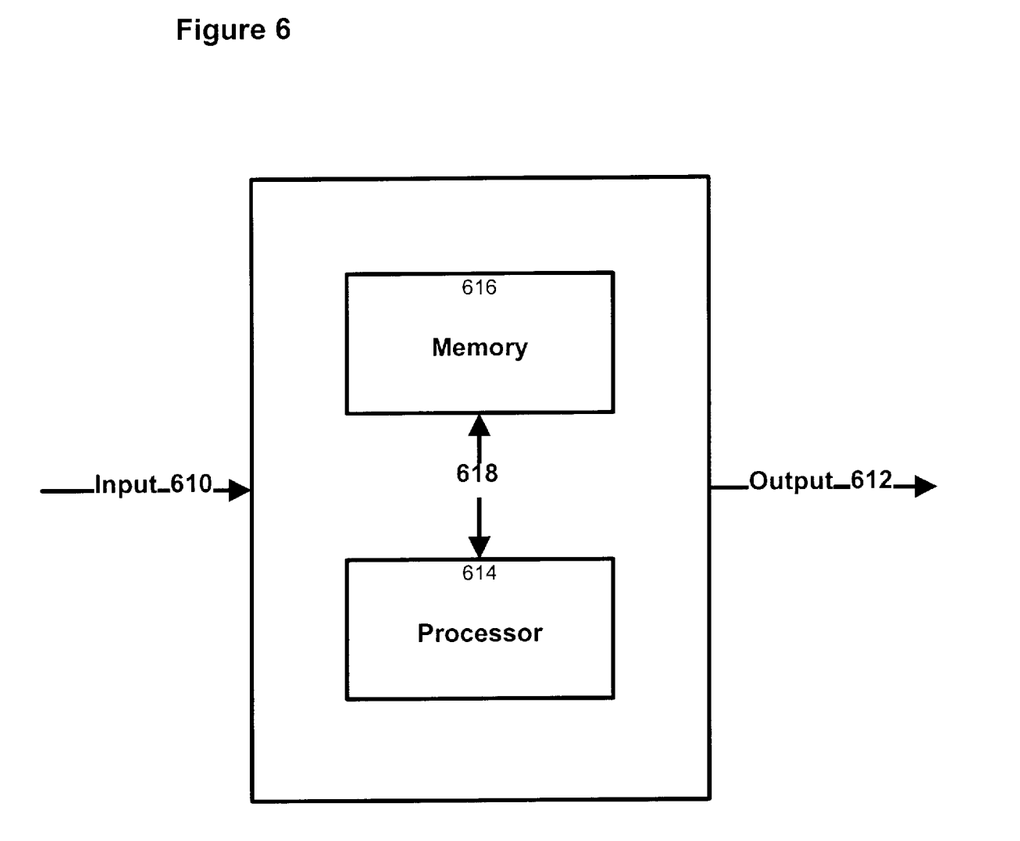
FIG. 6 is a block diagram of an apparatus that can be used to implement the function of the quality of service objective determination method detailed in FIG. 5.

The instructions stored in the memory 616 allow the apparatus to operate according to the flowchart illustrated at FIG. 5 depicting an example of a method to implement this invention in digital transmission mode.

The first step of the process, depicted at block 500, prior to effecting and setting changes to the network in order to regulate the QOS objective, is to determine the number of wireless links involved in the data packets pathway established through the network in the course of a given call. Several possible techniques can be used to perform this task. One of these techniques is for the apparatus shown at FIG. 6 to monitor the addresses of the data packets that are being transmitted through the pathway. This allows determining the source and the destination of the data packets. With this information, one can easily find the number of wireless links involved, such as by inquiring a network database. One specific example is classifying the calls in two categories, namely wireless-to-wireline and wireless-to-wireless. Thus if the data packets are directed to a wireline terminal, the system may be set to assume that one wireless link is involved in the data packet pathway. On the other hand, if a wireless-to-wireless connection is detected, then multiple wireless links are assumed to exist.

Another possibility in determining the number of wireless links would be to use inband signaling such as described in the international application PCT/95CA/00704, provided the inband signaling processors are implemented in the network. In such a case, a base station would issue an inband signaling message, which can be read only by another base station with the same capabilities, identifying the fact that it is receiving signals from a wireless terminal (i.e. a first wireless link). At the same time, it is monitoring the inband channel to verify if the entity at the other end is sending the same signaling message (i.e. a second wireless link). If such is the case, the call is between two wireless terminals (i.e. two wireless links are involved), and each base station then issues an out-of-band signaling message to the apparatus 600 to request that the quality of service value be set accordingly. If a base station is not receiving the signaling message from another base station, identifying the presence of a second wireless terminal, it concludes that there is only one wireless link and issues a message to the apparatus 600 to request that the quality of service value be set accordingly.

At step 510, the control system enters a decision step. If a tandem condition exists (two wireless links in this example), the apparatus 600 issues a control message to increase the power output level of the transmitters in both wireless links. In the example of a wireless-to-wireless call depicted in FIG. 1, established between mobile terminal 122 and mobile terminal 124, the control message issued by the apparatus 600 will raise the power output of the four transmitters involved in the two wireless links, namely the transmitter in the mobile terminal 122, the transmitter in the mobile terminal 124, and the transmitters in the base transceiver stations 126 and 128. This control signal is conveyed by using existing signaling mechanisms to the respective transmitters.

On the other hand, if a wireless-to-wireline terminal call is detected, say between mobile terminal 122 and land based terminal 140, the control signal issued by the apparatus 600 specifies a lower transmission power setting. This signal is conveyed by using existing signaling mechanisms to the transmitters in the mobile terminal 122 and the base transceiver station 126.

Other possibilities also exist. Instead of regulating the power output level of the transmitters involved in the pathway through which data packets are transported in the network in the course of a given call, one may alter other parameters that influence the frame error rate in a given link. For example, one such parameter is the specific forward error correction protocol used. This time the apparatus 600 issues a control signal to the mobile terminal and the associated base transceiver station for each wireless link to alter the forward error correction protocol that is used (i.e., switching to a protocol which can reduce the frame error rate). An example would be to concatenate two FEC techniques before issuing the data packets. In the case of a call utilizing a single wireless link, a basic protocol can be used, rather than a more sophisticated one.

Yet, another possibility in regulating the quality of service objective is to change the network frequency reuse in order to increase the Energy-per-bit to Noise density ratio (Eb/No).

In another possible variant, the apparatus 600, instead of transmitting control signals that dictate to the various components of the network to change specific settings, the apparatus 600 may transmit a quality of service target value and let the control elements in the specific wireless links involved in the course of a given call determine the best parameter adjustment to make to meet the FER setting knowing their capabilities and system state. For example, the control elements in a given wireless link may make the decision of altering the power output level of the transmitters. The control elements of another wireless link, however, may decide to alter the forward error correction protocol or frequency reuse.

Finally, at step 540, the system initiates a loop to verify if the connection is terminated. If it is, the process is stopped, and if it is not, the system continues to monitor the signaling and control data to verify if the network routing has changed.

The above description of a preferred embodiment should not be interpreted in any limiting manner since variations and refinements can be made without departing from the spirit of the invention. The scope of the invention is defined in the appended claims and their equivalents.

We claim:

1. A communication network, comprising:
   a) a plurality of links capable of transporting data, at least one of said links being a wireless link, in the course of a given call, selected ones of said plurality of links being connected to one another to establish a pathway for data to be transported through said network, said pathway being characterized by an end-to-end error rate;
   b) a control system operative for altering at least one parameter of said network that influences the end-to-end error rate of the pathway established in the course of a given call, in dependence upon a number of wireless links contained in the pathway over which data associated with the given call is transported through said network.

2. A communication network as defined in claim 1, wherein said data is in digital transmission format.

3. A communication network as defined in claim 1, wherein said control system is located in a mobile switching center of said communication network.

4. A communication network as defined in claim 1, wherein the pathway established in the course of a given call includes a wireless link established between a base station and a wireless terminal.

5. A communication network as defined in claim 1, wherein the pathway established in the course of a given call includes a wireline link.

6. A communication network as defined in claim 5, wherein said wireline link is part of a PSTN.

7. A communication network as defined in claim 5, wherein said wireline link is part of an ISDN.

8. A communication network as defined in claim 5, wherein said wireline link is part of an Internet network.

9. A communication network as defined in claim 1, wherein the pathway established in the course of a given call includes two wireless links.

10. A communication network as defined in claim 1, wherein said control system utilizes out-of-band signaling to receive and issue messages to control said parameters of the network.

11. A communication network as defined in claim 1, wherein at least one of said parameters is the power output level of a transmitter in a given wireless link.

12. A communication network as defined in claim 1, wherein at least one of said parameters is the type Forward error correction (FEC) techniques for data packets transported over a given link.

13. A communication network as defined in claim 1, wherein at least one of said parameters is the frequency reuse of the network.

14. A communication network as defined in claim 1, wherein said control system includes:
   a) an input for receiving data indicative of a number of wireless links comprised in the pathway established in a course of a given call;
   b) power output level determination means coupled to said input for determining a power output level of a transmitter in one of the wireless links comprised in the pathways established in the course of the given call in dependence of the number of wireless links involved in the pathway established in the course of the given call;
   c) an output coupled to said power output level determination means for generating data indicative of the power output level determined by said power output level determination means.

15. A communication network, comprising:
   a) a plurality of links capable of transporting data, at least one of said links being a wireless link, in a course of a given call selected ones of said plurality of links being connected to one another to establish a pathway for data to be transported through said network;
   b) a control system for regulating a power output level of a transmitter in a given wireless link of said network, said control system providing means for setting said transmitter at a first setting when said given link is comprised in a pathway including N wireless links and at a second setting when said given link is comprised in a pathway including M wireless links, where M<N and in said first setting said transmitter operates at a higher power output level than in said second setting.

16. A communication network as defined in claim 15, wherein said control system is located in a mobile switching center of said communication network.

17. A communication network as defined in claim 15, wherein the pathway established in the course of a given call includes a wireless link established between a base station and a wireless terminal.

18. A communication network as defined in claim 15, wherein the pathway established in the course of a given call includes a wireline link.

19. A communication network as defined in claim 18, wherein said wireline link is part of a PSTN.

20. A communication network as defined in claim 18, wherein said wireline link is part of an ISDN.

21. A communication network as defined in claim 18, wherein said wireline link is part of an Internet network.

22. A communication network as defined in claim 15, wherein the pathway established in the course of a given call includes two wireless links.

23. A communication network as defined in claim 15, wherein said control system utilizes out-of-band signaling to issue a message to control the power output level of the transmitter.

24. A communication network, comprising:
   a) a plurality of links capable of transporting data, at least one of said links being a wireless link, in a course of a given call selected ones of said plurality of links being connected to one another to establish a pathway for data to be transported through said network;
   b) a control system for regulating a power output level of a transmitter in a given wireless link of said network, said control system providing means for setting said transmitter at a first setting when said given link is comprised in a pathway established in a course of a wireless-to-wireless call and at a second setting when said given link is comprised in a pathway established in a course of a wireless-to-wireline call, in said first setting said transmitter operates at a higher power output level than in said second setting.

25. A communication network as defined in claim 24, wherein said control system is located in a mobile switching center of said communication network.

26. A communication network as defined in claim 24, wherein the pathway established in the course of a given call includes a wireless link established between a base station and a wireless terminal.

27. A communication network as defined in claim 24, wherein the pathway established in the course of a given call includes a wireline link.

28. A communication network as defined in claim 27, wherein said wireline link is part of a PSTN.

29. A communication network as defined in claim 27, wherein said wireline link is part of an ISDN.

30. A communication network as defined in claim 27, wherein said wireline link is part of an Internet network.

31. A communication network as defined in claim 24, wherein the pathway established in the course of a given call includes two wireless links.

32. A communication network as defined in claim 24, wherein said control system utilizes out-of-band signaling to issue a message to control the power output level of the transmitter.

33. A communication network control processor comprising a processing unit and a storage unit for storing instructions for operation of said processing unit, said instructions implementing functional blocks, said control processor being capable of regulating at least one parameter of a communication network that includes a plurality of links capable of transporting data packets, at least one of said links being a wireless link, in a course of a given call selected ones of said plurality of links being connected to one another to establish a pathway for data packets to be transported through said network, said functional blocks including:

a) an input for receiving data indicative of a number of wireless links comprised in the pathway established in a course of a given call;

b) power output level determination unit coupled to said input for determining a power output level of a transmitter in one of the wireless links comprised in the pathway established in the course of the given call in dependence of the number of wireless links involved in the pathway;

c) an output coupled to said power output level determination unit for generating data indicative of the power output level determined by said power output level determination means.

34. A method for controlling a communication network to reduce a frame error rate, said network comprising:

a) a plurality of links capable of transporting data packets, at least one of said links being a wireless link, in a course of a given call selected ones of said plurality of links being connected to one another to establish a pathway for data packets to be transported through said network;

b) said method comprising the steps of:

i) establishing a pathway through said network to allow data packets to be transported from one terminal to another terminal;

ii) identifying a number of wireless links in the pathway established at step i);

iii) adjusting an output power level of a transmitter in at least one of the wireless links comprised in the pathway identified at step i) in dependence of a number of wireless links in the pathway identified at step ii).

35. A method as defined in claim 34, wherein the pathway established in the course of a given call includes a wireless link established between a base station and a wireless terminal.

36. A method as defined in claim 34, wherein the pathway established in the course of a given call includes a wireline link.

37. A method as defined in claim 36, wherein said wireline link is part of a PSTN.

38. A method as defined in claim 36, wherein said wireline link is part of an ISDN.

39. A method as defined in claim 36, wherein said wireline link is part of an Internet network.

40. A method as defined in claim 34, wherein the pathway established in the course of a given call includes two wireless links.

* * * * *